Patented Mar. 11, 1947

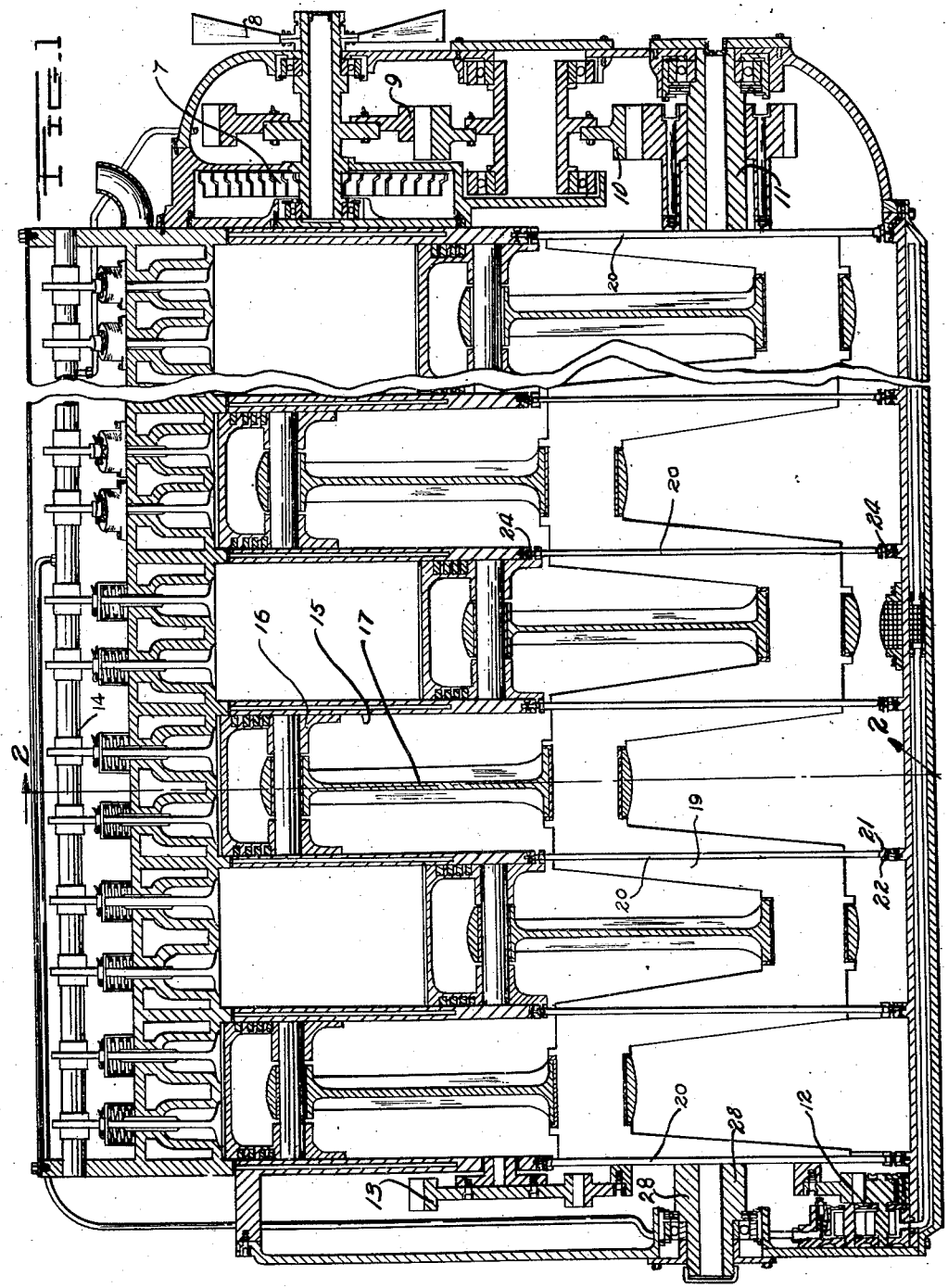

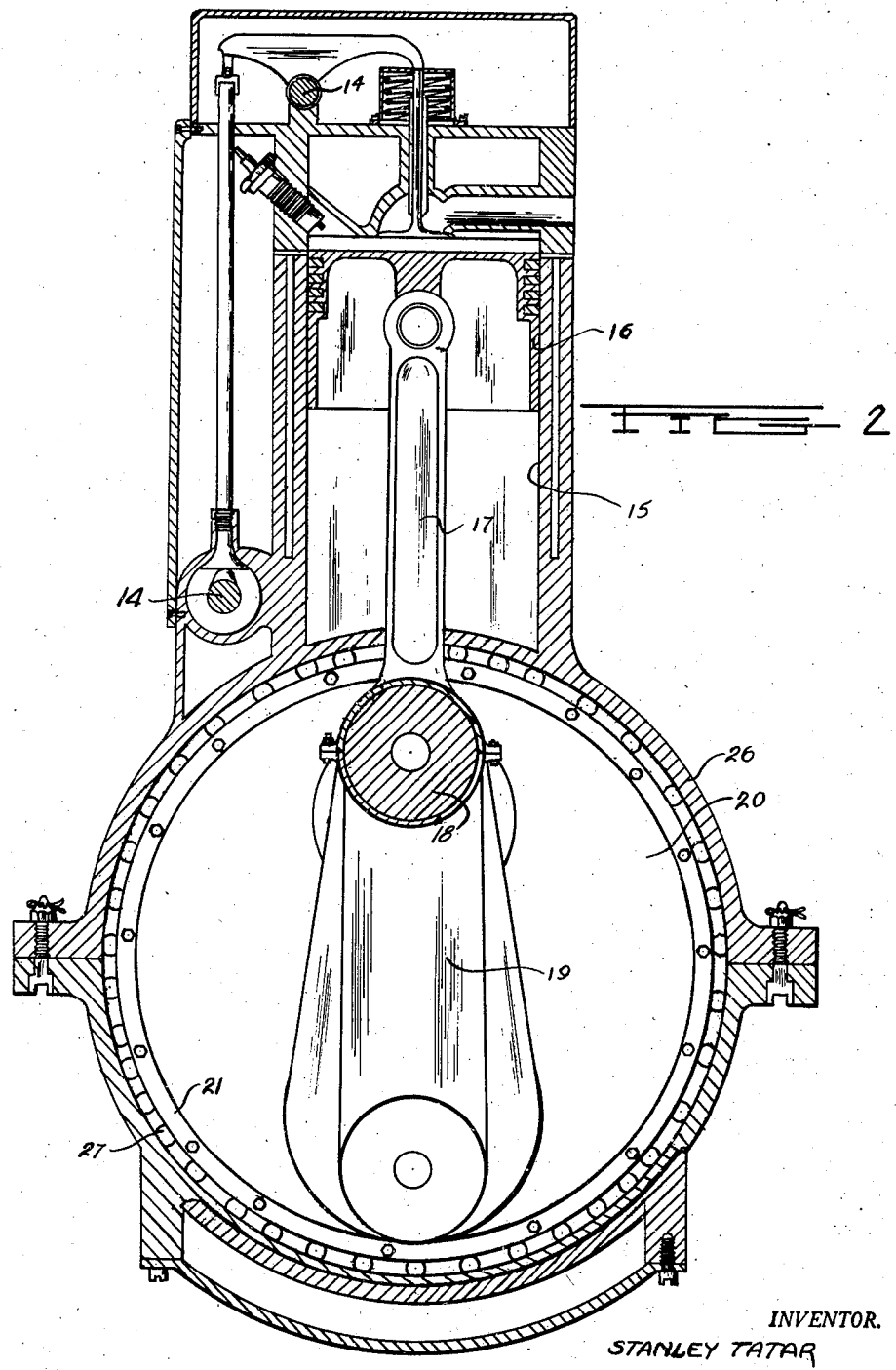

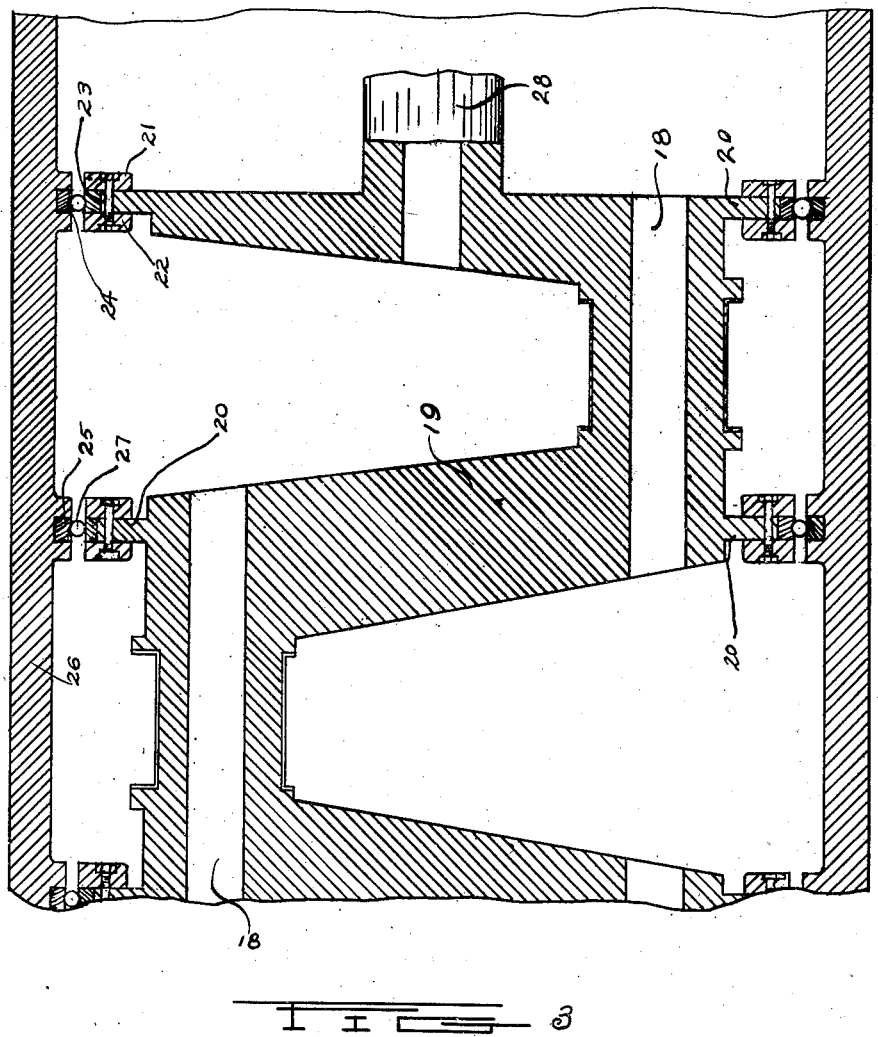

2,417,142

UNITED STATES PATENT OFFICE 2,417,142

ENGINE

Stanley Tatar, Detroit, Mich.

Application June 26, 1944, Serial No. 542,101

2 Claims. (Cl. 123—59)

My invention relates to a new and useful improvement in an engine of the reciprocating piston type whereby the reciprocating pistons are intended to drive a crank shaft. In the usual construction used with engines of this type, it is customary to mount the crank shaft in bearings at it opposite ends. It is an object of the present invention to provide a construction whereby the crank shaft is not mounted in the bearings at its opposite ends.

It is another object of the present invention to provide a novel crank shaft construction whereby the crank shaft carries a plurality of circular disks which rotate in circular bearings and serve as a means of supporting the crank shaft.

It is another object of the invention to provide in an engine of this type a crank shaft mounted in rotating bearings at various points between its ends.

Another object of the invention is the provision of an engine of this type so constructed and arranged that it will possess a maximum amount of strength, be compact, silent in its operation, substantially free from vibration and highly efficient in use.

Other objects will appear hereinafter.

It is recognized that various changes and modifications may be made in the structure illustrated without departing from the spirit of the invention and it is intended that such changes and modifications shall be encompassed within the scope of the claims which form a part hereof.

Forming a part of this specification are drawings in which,

Fig. 1 is a longitudinal, central, sectional view of the invention;

Fig. 2 is a transverse, sectional view taken on substantially line 2—2 of Fig. 1;

Fig. 3 is a fragmentary, sectional view of the invention showing parts slightly enlarged.

In the drawings, I have illustrated the engine provided with a water pump 7 and cooling fan 8, water pump drive mechanism 9 and 10 driven by the shaft 11, all of which form no part of the present invention and may be of any conventional type. I have also illustrated a suitable oil pump 12 and timing gear mechanism 13 adapted to drive the cam shaft 14, all of which also form no part of the invention. The engine is illustrated as provided with cylinders 15 in which is reciprocally mounted a piston 16 connected by a connecting rod 17 to a crank 18 of a crank shaft. This crank shaft is of special formation and the crank arms 19 are each formed integrally with a circular disk 20. This disk 20 carries at its periphery the side rings 21 and 22 which embrace one of the rings 23 of a roller bearing having the other ring 24 imbedded in a groove 25 formed in the crank case 26. These rings 23 and 24 are spaced apart by the balls 27. As shown, each of the crank arms is provided with a disk so that the crank shaft is thus supported at several points intermediate its ends and the necessity of a bearing at various point is avoided. Projecting centrally outwardly from the end disk 20 is the shaft 11 which serves to drive the gear 10. Projecting centrally outwardly from the opposite end disk 20 is the power take off shaft 28 which may be connected to any suitable shaft which it is intended to drive.

With an engine constructed in this manner, the vibration of the engine is reduced to a minimum and a smooth and easy operation is effected. The wear on the connecting rods is reduced to a minimum and the disks and crank arms serve to reinforce each other so that a sturdy, durable structure is thus provided.

What I claim as new is:

1. In an engine of the class described, a crank shaft; reciprocating pistons for driving said crank shaft; a connecting rod connecting each of said pistons with a crank of said crank shaft; a pair of crank arms at each of the cranks of said crank shaft; a circular disk formed integral with each of said crank arms; a crank case enclosing said disks; a pair of rings mounted on opposite faces of each of said disks and projecting in spaced relation to each other beyond the periphery of the disk; a bearing ring embraced by said first mentioned rings; a second bearing ring concentric to and embracing said first mentioned bearing ring, in spaced relation thereto and embedded in said crank case; and anti-friction members positioned between and engaging opposed faces of said bearing rings.

2. In an engine of the class described, a crank shaft; reciprocating pistons for driving said crank shaft; a connecting rod connecting each of said pistons with a crank of said crank shaft; a pair of crank arms at each of the cranks of said crank shaft; a circular disk formed integral with each of said crank arms; a crank case enclosing said disks; a pair of rings mounted on opposite faces of each of said disks and projecting in spaced relation to each other beyond the periphery of the disk; a bearing ring embraced by said first mentioned rings; a second bearing ring embracing and concentric to and in spaced relation to said first mentioned bearing ring and fixedly mounted on the inner surface of the crank case; and anti-friction members positioned between and engaging opposed faces of said bearing rings.

STANLEY TATAR.

REFERENCES CITED

The following references are of record in the file of this patent:

UNITED STATES PATENTS

| Number | Name | Date |
|---|---|---|
| 988,021 | Okey | Mar. 28, 1911 |
| 1,026,849 | Coffin | May 21, 1912 |
| 1,201,242 | Berlize | Oct. 17, 1916 |
| 1,662,740 | Dennison | Mar. 13, 1928 |